(12) United States Patent
Tung et al.

(10) Patent No.: US 11,662,800 B2
(45) Date of Patent: May 30, 2023

(54) ELECTRONIC DEVICE WITH POWER-OFF PARTITION AND PARTITION-BASED POWER-OFF METHOD THEREFOR

(71) Applicant: AICONNX Technology Corporation, Hsinchu (TW)

(72) Inventors: Hsu-Jung Tung, HsinChu (TW); Yu-Pin Lin, HsinChu (TW); Lien-Hsiang Sung, HsinChu (TW); Wei-Liang Cheng, HsinChu (TW)

(73) Assignee: AICONNX TECHNOLOGY CORPORATION, Hsinchu (TW)

( * ) Notice: Subject to any disclaimer, the term of this patent is extended or adjusted under 35 U.S.C. 154(b) by 112 days.

(21) Appl. No.: 17/470,586

(22) Filed: Sep. 9, 2021

(65) Prior Publication Data
US 2022/0083124 A1    Mar. 17, 2022

Related U.S. Application Data

(60) Provisional application No. 63/079,059, filed on Sep. 16, 2020.

(30) Foreign Application Priority Data

Jan. 14, 2021   (TW) ................................ 110101513

(51) Int. Cl.
*G06F 1/26*         (2006.01)
*G06F 1/32*         (2019.01)
(Continued)

(52) U.S. Cl.
CPC .......... *G06F 1/3287* (2013.01); *G06F 1/3206* (2013.01); *G06F 1/3296* (2013.01)

(58) Field of Classification Search
CPC .... G06F 1/3206; G06F 1/3287; G06F 1/3296; G06F 1/3203; Y02D 10/00
See application file for complete search history.

(56) References Cited

U.S. PATENT DOCUMENTS

| | | | |
|---|---|---|---|
| 9,621,383 B1* | 4/2017 | Urienza | H04L 25/0266 |
| 2015/0381219 A1* | 12/2015 | Kramer | H03F 1/02 |
| | | | 375/297 |
| 2016/0087780 A1* | 3/2016 | Goswami | H04B 5/0031 |
| | | | 370/498 |

FOREIGN PATENT DOCUMENTS

TW        I730849 B      6/2021

* cited by examiner

*Primary Examiner* — Nitin C Patel
(74) *Attorney, Agent, or Firm* — McClure, Qualey & Rodack, LLP

(57) ABSTRACT

The electronic device with power-off partition includes a signal transmitting module, two repeater modules, and a working module. Each of the repeater modules includes a first power domain, a second power domain, and a transceiver circuit. A transmission path between the first power domain and the second power domain is maintained at a logic state when the second power domain is in power off mode. The transceiver circuit of one of the two repeater modules encodes a standby signal obtained from the signal transmitting module and transmits an encoded standby signal. The transceiver circuit of the other of the repeater modules decodes the encoded standby signal and transmits a decoded standby signal. The working module transmits, according to the decoded standby signal, a power-off signal to the transceiver circuits of the two repeater modules, so that the second power domains enter the power-off mode in response to the power-off signal.

20 Claims, 5 Drawing Sheets

(51) Int. Cl.
*G06F 1/3287* (2019.01)
*G06F 1/3206* (2019.01)
*G06F 1/3296* (2019.01)

ELECTRONIC DEVICE WITH POWER-OFF PARTITION AND PARTITION-BASED POWER-OFF METHOD THEREFOR

CROSS-REFERENCES TO RELATED APPLICATIONS

This application claims the benefit of U.S. provisional application Ser. No. 63/079,059, filed on Sep. 16, 2020 and claims the priority of Patent Application No. 110101513 filed in Taiwan, R.O.C. on Jan. 14, 2021. The entirety of the above-mentioned patent applications are hereby incorporated by references herein and made a part of the specification.

BACKGROUND

Technical Field

The present invention relates to a power-off technology for electronic devices, and in particular, to an electronic device with power-off partition and a partition-based power-off method therefor.

Related Art

In order to reduce energy consumption for operation of electronic devices, each electronic element (such as an integrated circuit) in the electronic device is usually divided into a plurality of power domains, and unused power domains in the electronic device are turned off with only partial power domain turned on for waking up the electronic device to work (for example, for waking up other power domains in the electronic device that are turned off, so that the previously turned-off power domains perform corresponding operations). Therefore, at the same time point, there is a power domain in a power on mode (herein referred to as a first power domain) and another power domain in a power off mode (herein referred to as a second power domain).

However, when the second power domain is powered off, in order to prevent unknown signals (for example, noise), from the second power domain, from entering the first power domain and interfering with logic operation in the first power domain, an isolation cell is disposed between the first power domain and the second power domain to avoid interference between power domains that are powered on and power domains that are powered off. In addition, in order to accurately prevent unknown signals, from the second power domain, from entering the first power domain, an accurate time for enabling the isolation cell to isolate the signal transmission between the first power domain and the second power domain (for example, if the isolation cell is enabled too early, a signal cannot be transmitted between the first power domain and the second power domain, and if the isolation cell is enabled too late, unknown signals interfere with the first power domain, causing the isolation cell to fail).

When new elements are added to the electronic device, since a signal path between powers domain for waking up the electronic device into work changes, the time for enabling each isolation cell needs to be redesigned. In other words, addition of each new one element requires a change of a system design in the electronic device (for example, redesign of the signal path between the power domains for waking up the electronic device and redesign of the time for enabling the isolation cell) to still accurately prevent unknown signals, from the power domain that are powered off, from entering the power domain that are powered on, which increases workloads of circuit designing personnel.

SUMMARY

In view of the above, the present invention provides an electronic device with power-off partition and a partition-based power-off method therefor, which can prevent unknown signals, from a power domain that is powered off, from entering a power domain that is powered on without changing an original system design of the electronic device.

According to some embodiments, the electronic device with power-off partition includes a signal transmitting module, two repeater modules, and a working module. The signal transmitting module is configured to transmit a standby signal. Each of the repeater modules includes a first power domain, a second power domain, and a transceiver circuit. When the second power domain is in a power off mode, a transmission path between the first power domain and the second power domain is maintained in a logic state. The transceiver circuit is in the first power domain. The transceiver circuit of one of the two repeater modules encodes the standby signal obtained from the signal transmitting module and transmits an encoded standby signal. The transceiver circuit of the other of the repeater modules decodes the encoded standby signal and transmits a decoded standby signal. The working module transmits, according to the decoded standby signal, a power-off signal to the transceiver circuits of the two repeater modules, so that the second power domains of the two repeater modules enter, in response to the power-off signal, the power off mode.

According to some embodiments, a partition-based power-off method for an electronic device is provided. The electronic device includes a signal transmitting module, two repeater modules, and a working module. Each of the repeater module includes a first power domain, a second power domain, and a transceiver circuit in the first power domain. The partition-based power-off method for an electronic device includes: encoding, by the transceiver circuit of one of the two repeater modules, a standby signal from the signal transmitting module, and transmitting an encoded standby signal; encoding, by the transceiver circuit of the other of the repeater modules, the encoded standby signal, and transmitting a decoded standby signal; and transmitting, by the working module according to the decoded standby signal, a power-off signal to the transceiver circuits of the two repeater modules, so that the second power domains of the two repeater modules enter, in response to the power-off signal, a power off mode. When the second power domain of each of the repeater modules enters the power off mode, a transmission path between the first power domain and the second power domain of each of the repeater modules is maintained in a logic state.

Based on the above, according to the embodiments of the present invention, when a power domain in the repeater module of the electronic device is powered off, a transmission path between the power domain that is powered off and a power domain that is powered on is stably maintained in a logic state, thereby preventing unknown signals (including noise), from the power-off power domain, from entering another power domain and interfering with the logic operation of the power domain, to maintain normal operation of the electronic device. Therefore, an isolation cell is not required, and a cumbersome isolation setting process is not required either. In this way, when a new element is added, an electronic device can be woken up and caused to enter the standby mode without changing a system design of the electronic device, thus greatly reducing design costs and design duration of an electronic device.

DETAILED DESCRIPTION

Some terms are used in this specification to designate specific elements. Those of people having ordinary skill in the art should understand that hardware manufacturers may designate the same element with different names. Elements should be distinguished between each other by using differences in function of is to be used as a criterion instead of difference in name. In addition, the term "coupled to" herein includes any direct and indirect electrical connection means. Therefore, an expression that "a first device is coupled to a second device" described herein means that the first device may be directly electrically connected to the second device or indirectly electrically connected to the second device through other devices or connecting means.

Figure 1:
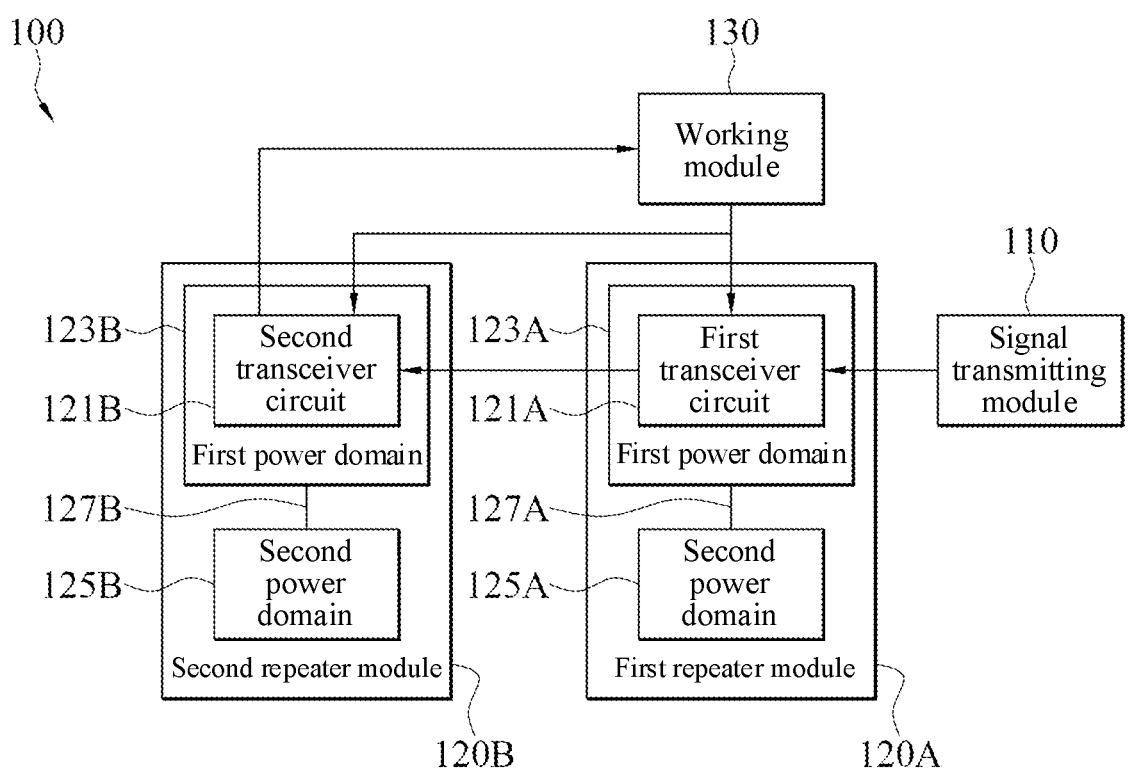
FIG. 1 is a schematic block diagram of an electronic device with power-off partition according to an embodiment of the present invention.

Referring to FIG. 1, FIG. 1 is a schematic block diagram of an electronic device 100 with power-off partition according to an embodiment of the present invention. The electronic device 100 with power-off partition includes a signal transmitting module 110, two repeater modules (which are referred to as a first repeater module 120A and a second repeater module 120B below), and a working module 130. In this embodiment, the electronic device is described by way of example as having two repeater modules (the first repeater module 120A and the second repeater module 120B), but the present invention is not limited thereto, and the electronic device 100 may also have a greater number of repeater modules. The first repeater module 120A is coupled to the signal transmitting module 110, and the second repeater module 120B is coupled to the first repeater module 120A and the working module 130. The first repeater module 120A and the second repeater module 120B are configured to assist signal transmission between the signal transmitting module 110 and the working module 130 to extend a signal path between the signal transmitting module 110 and the working module 130, so that the signal transmitting module 110 and the working module 130 can be disposed far away from each other in the electronic device 100. The signal transmitting module 110 is configured to transmit a signal to the working module 130 through the first repeater module 120A and the second repeater module 120B, so that the working module 130 parses the signal and then performs corresponding actions. The electronic device 100 may be a separate TV. The signal transmitting module 110 is for example, but is not limited to, an input device such as an infrared remote control, a microphone, a wireless network remote control device (for example, a mobile device supporting a wireless network, a notebook computer, a tablet computer, or the like), a touch-control remote control device, or the like. The working module 130 is, for example, but is not limited to, an operation circuit such as an embedded controller, a central processing unit, a microprocessor, an application-specific integrated circuit, a system-on-chip, or the like. The first repeater module 120A and the second repeater module 120B are, for example, but are not limited to, a circuit such as an application-specific integrated circuit, a bridge, or the like for extending a signal path.

Each of the repeater modules includes two power domains: a first power domain and a second power domain. For example, the first repeater module 120A includes a first power domain 123A and a second power domain 125A. The second repeater module 120B includes a first power domain 123B and a second power domain 125B. For some purposes (for example, power saving), power supply statuses of the two power domains in the same repeater module may be different, for example, one is powered off, and the other is normally powered-on. Each of the repeater modules further includes a transceiver circuit in the first power domain. For example, the first repeater module 120A includes a first transceiver circuit 121A. The second repeater module 120B includes a second transceiver circuit 121B. The first transceiver circuit 121A is configured to receive signals from outside of the first repeater module 120A and output signals to outside of the first repeater module 120A. The second transceiver circuit 121B is configured to receive signals from outside of the second repeater module 120B and output signals to outside of the second repeater module 120B. In this embodiment, each of the repeater modules is described by way of example as having two power domains, but the present invention is not limited thereto, and each of the repeater modules may also have a greater number of power domains.

In some embodiments, the first power domains 123A, 123B and the second power domains 125A, 125B may be processing units, modules, circuits, part of a circuit, or any combination of different circuits. For example, if the first power domains 123A, 123B are circuits related to functions of waking up the electronic device 100 and causing the electronic device to enter a standby mode, the first power domains 123A, 123B have transceiver circuits (the first transceiver circuit 121A and the second transceiver circuit 121B), and processing units in the first transceiver circuit 121A and the second transceiver circuit 121B are configured to process signals related to waking up the electronic device 100 and causing the electronic device to enter the standby mode, while the second power domains 125A, 125B may include processing units configured to process main functions. For some purposes (such as power saving), a power domain with a higher data processing capability or higher power consumption may be powered off, and a power domain with a lower data processing capability or lower power consumption may be normally powered on. In some cases (for example, the electronic device 100 is woken up and switched from power saving to a full load), the power, that is previously powered off, with a higher data processing capability or higher power consumption may be restored through the power domain that is normally powered on. For example, the processing units, in the first transceiver circuit 121A and the second transceiver circuit 121B, that process the signals related to waking up the electronic device 100 and causing the electronic device to enter a standby mode may have a lower data processing capability compared to the processing units configured to process main functions. For example, the processing units in the first transceiver circuit 121A and the second transceiver circuit 121B are small central processing units (for example, 8051 processors, or there is no central processing unit), while the processing units in the second power domain 125A, 125B that process main functions are large central processing units (such as an ARM processor).

Figure 2:
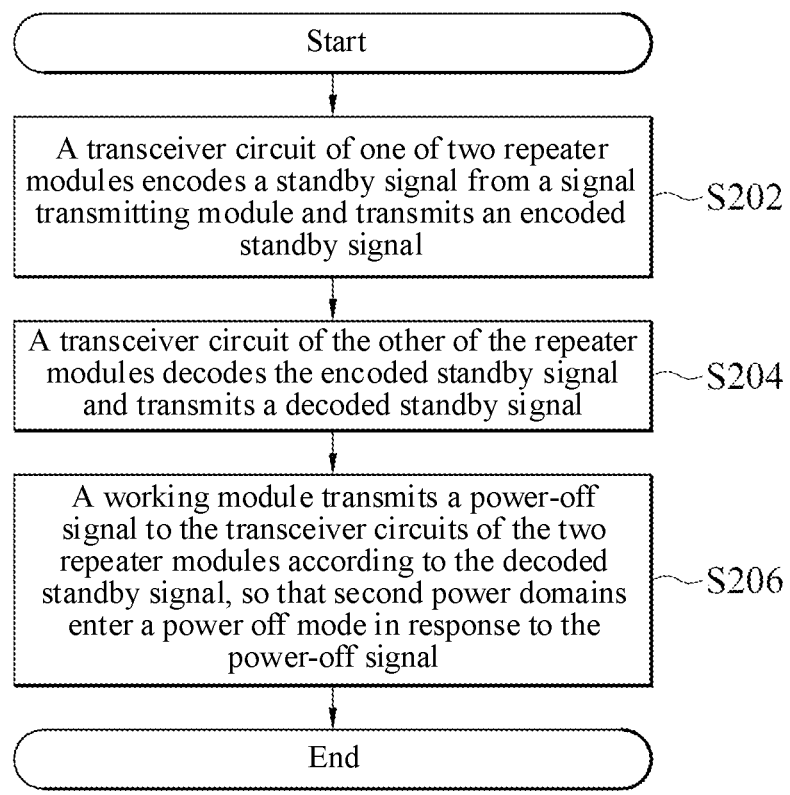
FIG. 2 is a schematic flowchart of a partition-based power-off method for an electronic device according to an embodiment of the present invention.

FIG. 2 is a schematic flowchart of a partition-based power-off method for an electronic device according to an embodiment of the present invention. The partition-based power-off method is adapted to an electronic device 100 with power-off partition, which can prevent a power domain that is powered off from interfering with another power domain in the same repeater module. In the following description, the first power domains 123A, 123B are circuits related to functions of waking up the electronic device 100 and causing the electronic device to enter the standby mode, and the second power domains 125A, 125B are related circuits configured to process main functions. The first power domains 123A, 123B enter a power on mode, so that circuits or elements in the first power domains 123A, 123B are normally supplied with power to operate. The second power domains 125A, 125B may enter the power on mode or a power off mode, so that the second power domains 125A, 125B are normally supplied with power in the power on mode to operate, and are not supplied with power in the power off mode to save power.

Refer to FIG. 1 and FIG. 2 together. First, the transceiver circuit (the first transceiver circuit 121A) of one of the two repeater modules (the first repeater module 120A herein) encodes a standby signal from the signal transmitting module 110, and transmits an encoded standby signal (step S202). Specifically, to save energy of the electronic device 100 or to stop the electronic device 100 (for example, when to cause the electronic device 100 to enter the standby mode), the signal transmitting module 110 transmits a standby signal to the first repeater module 120A. After a signal transceiver module in the first transceiver circuit 121A of the first repeater module 120A receives the standby signal, a processing unit, coupled to the signal transceiver module, in the first transceiver circuit 121A encodes, according to a preset encoding rule, the standby signal to generate an encoded standby signal, and outputs the encoded standby signal through the signal transceiver module of the first transceiver circuit 121A. The encoding may be, for example, but is not limited to, non return to zero (NRZ) encoding, return to zero (RZ) encoding, Manchester encoding, differential Manchester encoding, alternating mark inversion (AMI) encoding, double binary encoding, non return zero inverted (NRZI) encoding, bipolar return to zero encoding, or the like. The standby signal may be, for example, but is not limited to, a Wi-Fi signal, a D-MAC signal, a keyboard scan signal, an infrared data association (IRDA), or the like. In some embodiments, the signal transceiver module may be a wireless signal transceiver module or a wired signal transceiver module. The wireless signal transceiver module may be, for example, but is not limited to, a Wi-Fi transceiver module, a Bluetooth transceiver module, or the like. The wired signal transceiver module may be implemented by a physical connection line.

Next, the transceiver circuit (the second transceiver circuit 121B) of the other of the repeater modules (the second repeater module 120B herein) decodes the encoded standby signal, and transmits a decoded standby signal (step S204). Specifically, the signal transceiver module of the second transceiver circuit 121B of the second repeater module 120B receives the encoded standby signal from the first transceiver circuit 121A of the first repeater module 120A. After receiving the encoded standby signal, a processing unit, coupled to the signal transceiver module, in the second transceiver circuit 121B decodes, according to a preset decoding rule, the encoded standby signal to generate a decoded standby signal (that is, restore the above standby signal), and outputs the decoded standby signal through the signal transceiver module of the second transceiver circuit 121B. In some embodiments, the preset decoding rule corresponds to the preset encoding rule. For example, the preset encoding rule is Manchester encoding, and the preset decoding rule is Manchester decoding.

After the decoded standby signal is generated, the working module 130 transmits, according to the decoded standby signal, a power-off signal to the transceiver circuits (the first transceiver circuit 121A and the second transceiver circuit 121B) of the two repeater modules (the first repeater module 120A and the second repeater module 120B), so that the second power domains (the second power domains 125A, 125B) of the two repeater modules enter, in response to the power-off signal, a power off mode (step S206). Specifically, the working module 130 parses information carried in the decoded standby signal to obtain information for causing the electronic device 100 to enter the standby mode (for example, a standby instruction obtained by pressing a standby button of an infrared remote control device, a standby instruction of a wireless remote control device, a voice standby instruction of a microphone, or the like), and transmits the power-off signal to the first transceiver circuit 121A and the second transceiver circuit 121B, so that the second power domains 125A, 125B enter, in response to the power-off signal, the power off mode without supply of power, to save energy of the electronic device 100.

When the second power domain 125A, 125B is in the power off mode, a transmission path 127A, 127B between the first power domain 123A, 123B and the second power domain 125A, 125B is maintained in a logic state. Specifically, when the electronic device 100 is in a normal working state, the first power domains 123A, 123B and the second power domains 125A, 125B are all in the power on mode, so that circuits or elements in the first power domains 123A, 123B and the second power domains 125A, 125B are normally supplied with power to operate, and the second power domains 125A, 125B can transmit a signal to the first power domains 123A, 123B through the transmission paths 127A, 127B. However, when the electronic device 100 is in a power-saving state (such as a standby state), the first power domains 123A, 123B remain in the power on mode, and the second power domains 125A, 125B enter, in response to the power-off signal, the power off mode without supply of power. In this case, the transmission paths 127A, 127B may be stably maintained in the logic state through the circuit elements configured to maintain the logic state. In addition, since all signals on the transmission paths 127A, 127B are maintained in the logic state, unknown signals (including noise) that may be generated in the second power domains 125A, 125B that are powered off cannot enter the first power domains 123A, 123B through the transmission paths 127A, 127B, so that the first power domains 123A, 123B can maintain a normal logic operation without being interfered by the second power domains 125A, 125B that are powered off.

Figure 3:
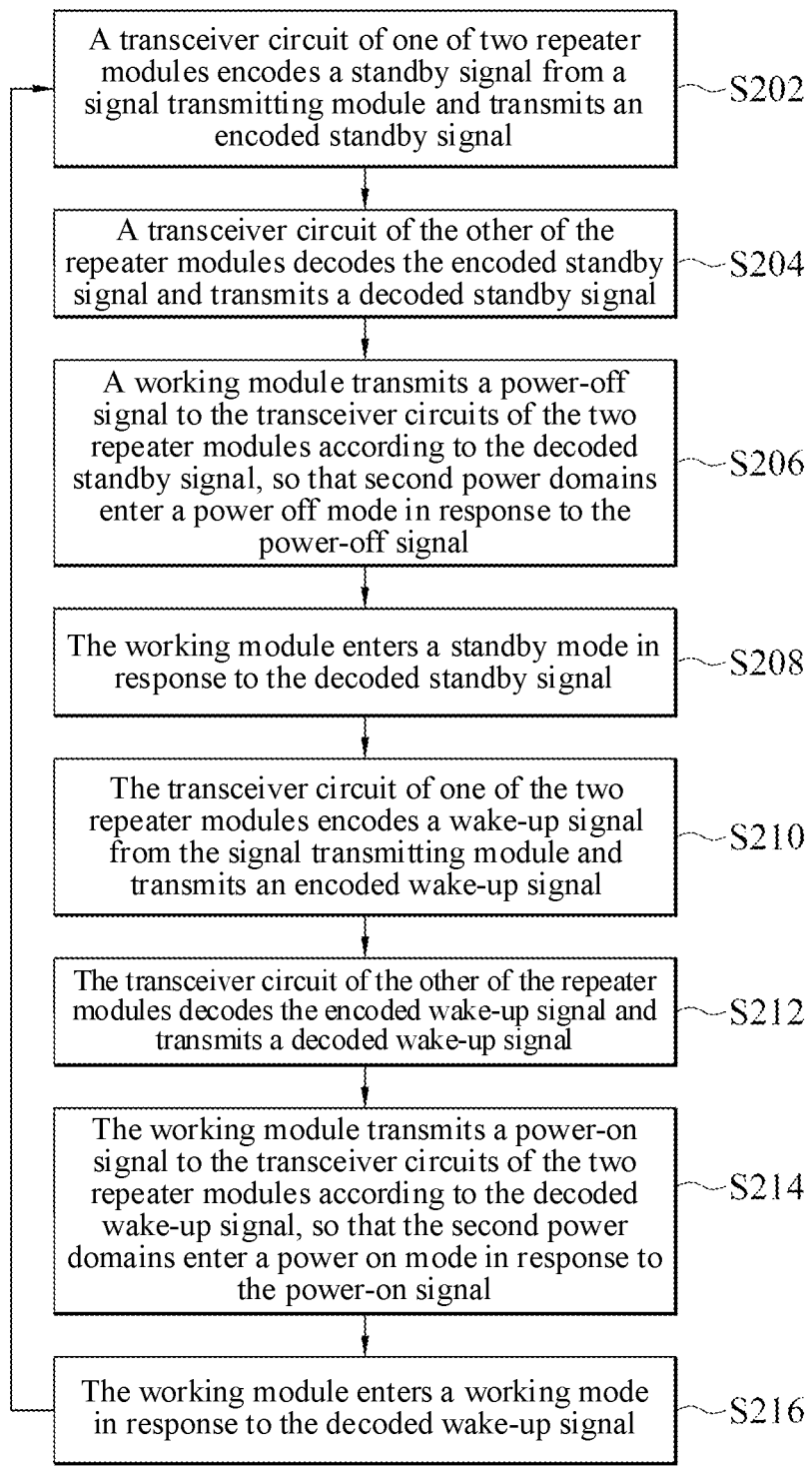
FIG. 3 is a schematic flowchart of a partition-based power-off method for an electronic device according to an embodiment of the present invention.

Refer to FIG. 1 and FIG. 3 together. FIG. 3 is a schematic flowchart of a partition-based power-off method for an electronic device according to an embodiment of the present invention. In some embodiments, after the second power domains 125A, 125B enter the power off mode, to wake up the electronic device 100 into work, the transceiver circuit (the first transceiver circuit 121A) of one (the first repeater module 120A herein) of the two repeater modules encodes a wake-up signal from the signal transmitting module 110, and transmits an encoded wake-up signal (step S210). Specifically, to wake up the electronic device 100 into work, the signal transmitting module 110 transmits a wake-up signal to the first repeater module 120A. In order to wake up the electronic device 100, the first power domain 123A is still in the power on mode when the electronic device 100 is in a power-saving state (for example, the second power domain 125A is in a power off mode). In this way, the first transceiver circuit 121A of the first repeater module 120A can still receive signals. After a signal transceiver module of the first transceiver circuit 121A of the first repeater module 120A receives the wake-up signal, a processing unit, coupled to the signal transceiver module, in the first transceiver circuit 121A encodes the wake-up signal according to a preset encoding rule to generate an encoded wake-up signal, and outputs the encoded wake-up signal through the signal transceiver module of the first transceiver circuit 121A.

In some embodiments, the wake-up signal may be a signal of the same type as a type of the standby signal. For example, if the standby signal is a Wi-Fi signal, the wake-up signal is also a Wi-Fi signal. However, the present invention is not limited thereto, and the wake-up signal may be a signal of a type different from a type of the standby signal. In some embodiments, the preset encoding rule used for the wake-up signal may be different from the preset encoding rule used for the standby signal. For example, for encoding the wake-up signal, a header (for example, information about a bit with a logic value of 0) representing wake-up information may be added to the encoded wake-up signal. For encoding the standby signal, a header (for example, information about a bit with a logic value of 1) representing standby information may be added to the encoded standby signal. However, the present invention is not limited thereto, and the preset encoding rule used for the wake-up signal may be the same as the preset encoding rule used for the standby signal.

Next, the transceiver circuit (the second transceiver circuit 121B) of the other of the repeater modules (the second repeater module 120B herein) decodes the encoded wake-up signal, and transmits a decoded wake-up signal (step S212). Specifically, in order to wake up the electronic device 100, the first power domain 123B is still in the power on mode when the electronic device 100 is in the power-saving state (for example, the second power domain 125B is in the power off mode). In this way, the second transceiver circuit 121B of the second repeater module 120B can still receive signals. The signal transceiver module of the second transceiver circuit 121B of the second repeater module 120B receives the encoded wake-up signal from the first transceiver circuit 121A of the first repeater module 120A. After receiving the encoded wake-up signal, the processing unit, coupled to the signal transceiver module, in the second transceiver circuit 121B decodes, according to a preset decoding rule, the encoded wake-up signal to generate a decoded wake-up signal (that is, restore the wake-up signal), and outputs the decoded wake-up signal through the signal transceiver module of the second transceiver circuit 121B. The preset decoding rule used for decoding the encoded wake-up signal may correspond to the preset encoding rule used for encoding the wake-up signal.

After the decoded wake-up signal is generated, the working module 130 transmits, according to the decoded wake-up signal, a power-on signal to the transceiver circuits (the first transceiver circuit 121A and the second transceiver circuit 121B) of the two repeater modules (the first repeater module 120A and the second repeater module 120B), so that the second power domains (the second power domains 125A, 125B) of the two repeater modules enter, in response to the power-on signal, a power on mode (step S214). Specifically, the working module 130 parses information carried in the decoded wake-up signal to obtain information for waking up the electronic device 100 into work (for example, a wake-up instruction obtained by pressing a wake-up button of the infrared remote control device, a wake-up instruction of the wireless remote control device, a voice wake-up instruction of the microphone, or the like), and transmits the power-on signal to the first transceiver circuit 121A and the second transceiver circuit 121B, so that the second power domains 125A, 125B enter the power on mode with supply of power from the power off mode without supply of power in response to the power-on signal, causing the electronic device 100 to enter a working state. After the electronic device 100 enters the working state, step S202 is performed to wait for a next standby signal to enter the power-saving state again.

Figure 4:
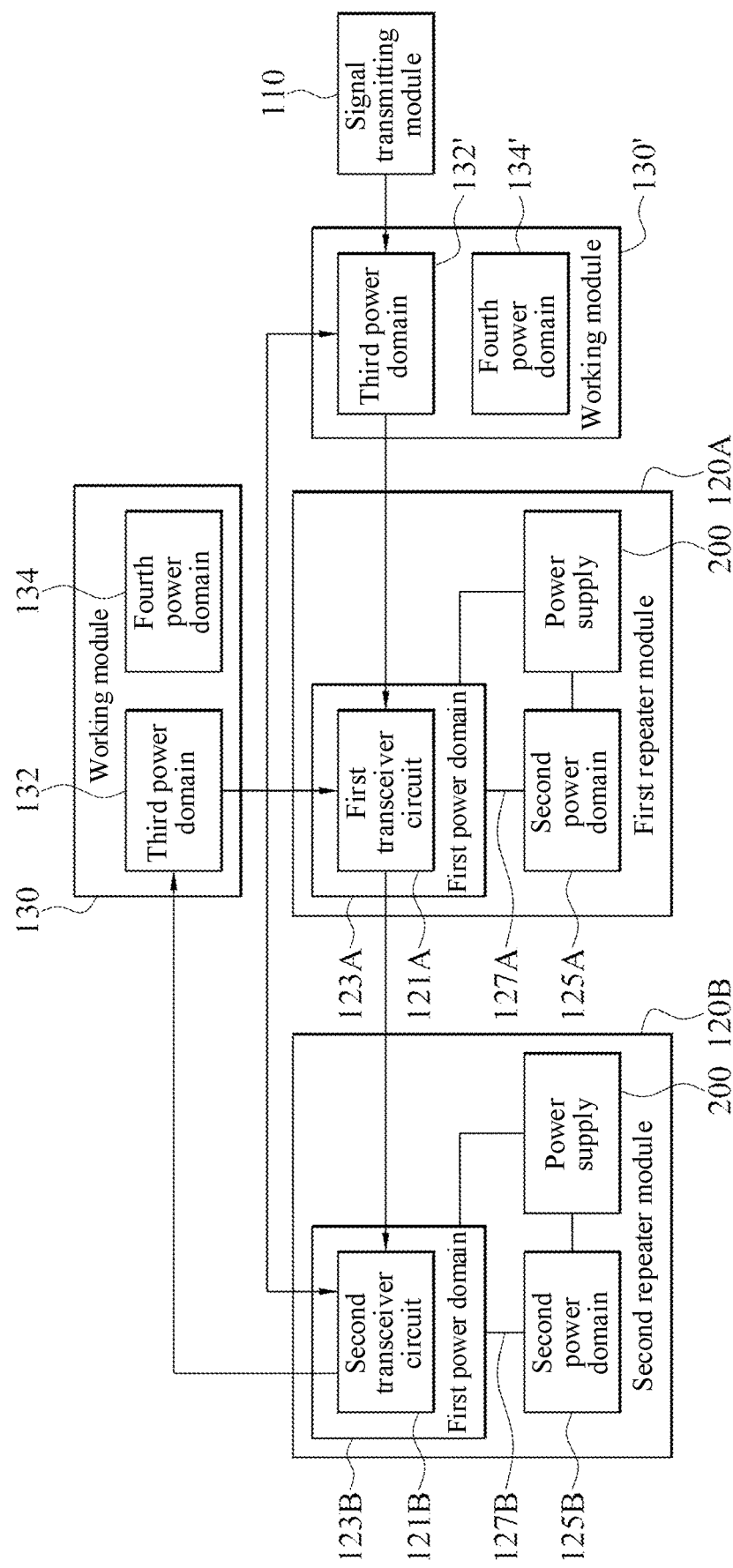
FIG. 4 is a schematic block diagram of an electronic device with power-off partition according to an embodiment of the present invention.

Refer to FIG. 3 and FIG. 4, FIG. 4 is a schematic block diagram of an electronic device 100 with power-off partition according to an embodiment of the present invention. In some embodiments, after the decoded standby signal is generated, the working module 130 enters a standby mode in response to the decoded standby signal (step S208). After the decoded wake-up signal is generated, the working module 130 enters a working mode in response to the decoded wake-up signal (step S216). Specifically, the working module 130 includes a third power domain 132 and a fourth power domain 134. The third power domain 132 is a circuit configured to wake up the electronic device 100 and cause the electronic device 100 to enter the standby mode. For example, the third power domain 132 is a circuit configured to receive the decoded standby signal and the decoded wake-up signal and transmit the power-off signal and the power-on signal. Therefore, the third power domain 132 is in the power on mode regardless of whether the electronic device 100 is in the working state or the power-saving state. The fourth power domain 134 is a circuit (for example, a circuit configured to control operations of other elements in the electronic device 100) configured to perform main functions. The working module 130 cuts off, in response to the decoded standby signal, supply of power to the fourth power domain 134 (that is, the fourth power domain 134 is in the power off mode) to enter the standby mode to save power, and transmits a power-off signal to cause the second power domains 125A, 125B to enter the power off mode. When the second power domains 125A, 125B are in the power off mode, the working module 130 restores, in response to the decoded wake-up signal, supply of power to the fourth power domain 134 (that is, the fourth power domain 134 is in the power on mode) to enter the working mode to restore all data and signal processing functions, and transmits the power-on signal to switch the second power domains from the power off mode to the power on mode, so that the electronic device 100 restores all processing functions.

In some embodiments, step S206 and step S208 may be transposed, or substantially simultaneously performed. Step S214 and step S216 may be transposed, or substantially simultaneously performed.

In some embodiments, another working module 130' is disposed between the signal transmitting module 110 and the first repeater module 120A, whose supply of power may be controlled by the working module 130. In other words, supply of power to internal elements in the electronic device 100 may be controlled by only one working module (such as the working module 130). Specifically, the working module 130' enters, in response to the power-off signal transmitted by the working module 130, the standby mode, and enters, in response to the power-on signal transmitted by the working module 130, the working mode. For example, the working module 130' includes a third power domain 132' and a fourth power domain 134'. The third power domain 132' is a circuit configured to wake up the electronic device 100 and cause the electronic device 100 to enter the standby mode. For example, the third power domain 132' is configured to receive the decoded standby signal and the decoded wake-up signal from the signal transmitting module 110, transmit the decoded standby signal and the decoded wake-up signal to the first repeater module 120A, and receive the power-off signal and the power-on signal from the working module 130. Therefore, the third power domain 132' is in the power on mode regardless of whether the electronic device 100 is in the working state or the power-saving state. The fourth power domain 134' is a circuit configured to perform main functions (for example, a circuit configured to perform main operations in the working module 130'). The fourth power domain 134' enters in the power off mode in response to the power-off signal, and is switched from the power off mode to the power on mode in response to the power-on signal, so as to achieve the purpose of power saving. In this embodiment, the working module 130' may be a control device of the display device, the fourth power domain 134' is a circuit configured to process image displaying, the working module 130 may be a TV host control device configured to control the supply of power to the internal elements of the electronic device 100, and the fourth power domain 134 may be a circuit configured to process an image video signal outputted to the working module 130'. Signal paths between different working modules can be extended by using the repeater modules (the first repeater modules 120A, 120B) be disposed of between different working modules (working modules 130, 130'), so that different working modules may be arranged far away from each other.

In some embodiments, as shown in FIG. 4, the first power domain 123A, 123B and the second power domain 125A, 125B are coupled to a power supply 200 to be supplied with power. In some embodiments, the third power domain 132, 132' and the fourth power domain 134, 134' may also be coupled to the power supply 200 to be supplied with power. The power supply 200 supplies power to the first power domain 123A, 123B and the third power domain 132, 132' regardless of whether the electronic device 100 is in the working state or in the power-saving state. In some embodiments, a switch (not shown in the figure) may be disposed between the second power domain 125A, 125B the fourth power domain 134, 134', and the power supply 200 to cut off or restore supply of power of the power supply 200 to the second power domain 125A, 125B and the fourth power domain 134, 134'. The switch is, for example, but is not limited to, an electronic switch (for example, a switch implemented by a transistor).

In some embodiments, in step S206, the power supply 200 stops, in response to the power-off signal, the supply of power to the second power domain 125A, 125B, so that the second power domain 125A, 125B enters the power off mode. Specifically, the power supply 200 activates, in response to the power-off signal from the first transceiver circuit 121A and the second transceiver circuit 121B or in response to the power-off signal from the working module 130, the switch, to cut off the supply of power to the second power domains 125A, 125B, so that the second power domains 125A, 125B enter the power off mode, and the circuits or elements in the second power domain are not supplied with power. The power-off signal may be a high-state signal or a low-state signal for activating the switch. In some embodiments, the power supply 200 may also activate, in response to the power-off signal, the switch to stop the supply of power to the fourth power domain 134' of the working module 130'. The power supply 200 may also activate, in response to the decoded standby signal, the switch to stop supply of power to the fourth power domain 134 of the working module 130, so that the working module 130 enters the standby mode (step S208).

In some embodiments, in step S214, the power supply 200 restores, in response to the power-on signal, the supply of power to the second power domains 125A, 125B, so that the second power domains 125A, 125B enter the power on mode. Specifically, the power supply 200 activates, in response to the power-on signal from the first transceiver circuit 121A and the second transceiver circuit 121B or in response to the power-on signal from the working module 130, the switch again, to restore the supply of power to the second power domains 125A, 125B again, so that the second power domains 125A, 125B enter the power on mode, and the circuits or elements in the second power domain are supplied with power. The power-on signal may be a high-state signal or a low-state signal for activating the switch again. In some embodiments, the power supply 200 may further activate, in response to the power-on signal, the switch again to restore the supply of power to the fourth power domain 134' of the working module 130'. The power supply 200 may further activate, in response to the decoded wake-up signal, the switch again to restore the supply of power to the fourth power domain 134 of the working module 130, so that the working module 130 enters the working mode (step S216).

In the above embodiment, the power supply 200 is disposed in the first repeater module 120A and the second repeater module 120B, but the present invention is not limited thereto. The power supply 200 may be disposed in other internal elements of the electronic device 100 (for example, the working module 130) or outside the electronic device 100. The power supply 200 is, for example, but is not limited to, a battery, an external power supply (such as a power adapter), or the like.

In the above embodiment, the first power domain 123A, 123B and the second power domain 125A, 125B are coupled to the same power supply 200. In some embodiments, the first power domain 123A, 123B and the second power domain 125A, 125B may be coupled to different power supplies 200. The different power supplies referred to herein mean that the power supply 200 coupled to the first power domain 123A, 123B and the power supply 200 coupled to the second power domain 125A, 125B may each be independently controlled or originate from different power supply terminals, and these power supplies 200 may have output voltages in the same voltage state or output voltages in different voltage states. In some embodiments, the third power domain 132, 132' and the fourth power domain 134, 134' of the working module 130, 130' may be coupled to the same power supply 200 or different power supplies.

Figure 5:
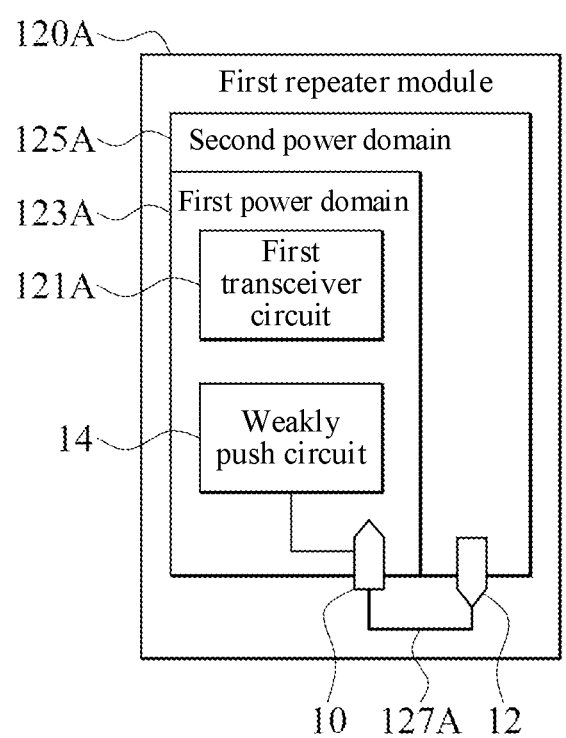
FIG. 5 is a schematic block diagram of a first repeater module according to an embodiment of the present invention.

Referring to FIG. 5, FIG. 5 is a schematic block diagram of a first repeater module 120A according to an embodiment of the present invention. For the convenience of description of the block diagram of internal circuits of each repeater module below, the electronic device is described by way of example as having only one repeater module (the first repeater module 120A herein). In other words, a block diagram of internal circuits of the second repeater module 120B may be the same or similar to the block diagram of internal circuits of the first repeater module 120A.

In some embodiments, the first repeater module 120A has a first power domain 123A and a second power domain 125A adjacent to each other, but the present invention is not limited thereto, and the first power domain 123A and the second power domain 125A may not be adjacent. The first repeater module 120A further includes a weakly push circuit 14. The weakly push circuit 14 is in the first power domain 123A and in a signal connection to the transmission path 127A. The weakly push circuit 14 is configured to generate a voltage state signal for stably maintaining a logic state of the transmission path 127A.

In some embodiments, the first power domain 123A has a first connection pad 10, and the second power domain 125A has a second connection pad 12. The second connection pad 12 is coupled to the first connection pad 10 through a connection line to form the transmission path 127A. The weakly push circuit 14 is also in the first power domain 123A and is coupled to the first connection pad 10, so as to be in a signal connection to the transmission path 127A through the first connection pad 10. When the electronic device 100 is in a normal working state, the first power domain 123A and the second power domain 125A are both in the power on mode, and the second power domain 125A at this point can transmit a signal to the first power domain 123A, which sequentially passes through the second connection pad 12, the transmission path 127A, and the first connection pad 10. However, when the electronic device 100 is in the power-saving state (such as the standby state), the first power domain 123A still remains the power on mode, and the second power domain 125A enters, in response to the power-off signal, the power off mode. In this case, the weakly push circuit 14 may output a voltage state signal through the first connection pad 10 to stably maintain the transmission path 127A in a logic state, so that the first connection pad 10 is not floating. In addition, unknown signals that may be generated by the second power domain 125A that is powered off cannot enter the first power domain 123A through the transmission path 127A, so that the first power domain 123A is not interfered by the second power domain 125A that is powered off.

In some embodiments, the weakly push circuit 14 is a weakly pull-high circuit or a weakly pull-low circuit. When the weakly push circuit 14 is a weakly pull-low circuit, a voltage state signal generated by the weakly pull-low circuit is a pull-down voltage signal, and the logic state of the transmission path 127A is maintained in a low logic state of 0 (for example, the weakly pull-low circuit generates a pull-down voltage signal through a pull-down resistor coupled to a reference ground terminal to maintain the logic state of the transmission path 127A in a low logic state). When the weakly push circuit 14 is a weakly pull-high circuit, a voltage state signal generated by the weakly pull-high circuit is a pull-up voltage signal, and the logic state of the transmission path 127A is maintained in a high logic state of 1 (for example, the weakly pull-high circuit generates a pull-up voltage signal through a pull-up resistor coupled to an operating voltage terminal to maintain the logic state of the transmission path 127A in a high logic state). The operating voltage terminal may be at a system voltage of the electronic device 100 or the first repeater module 120A.

In some embodiments, the weakly push circuit 14 may be implemented by a general-purpose input/output circuit (GPIO circuit). For example, since the transmission path 127A between the second power domain 125A and the first power domain 123A of the present invention is unidirectional, in the present invention, the GPIO circuit may be set to a general-purpose output (GPO) to be used in the second power domain 125A and a general-purpose input (GPI) circuit to be used in the first power domain 123A, and the GPIO circuit in the first power domain 123A serves as the weakly push circuit 14. The GPIO circuit is an analog circuit, which is controlled through an internal digital logic of the first power domain 123A or the second power domain 125A.

Moreover, when the electronic device 100 is in the normal working state (normally supplied with power), output data to be outputted by the second power domain 125A is transmitted to the first power domain 123A by passing through an output buffer and an input/output pin in the GPO circuit and then the transmission path 127A, and the first power domain 123A receives the output data through the input/output pin and an input buffer in the GPI circuit as input data of the first power domain 123A. When the electronic device 100 is in the power-saving state, the first power domain 123A still remains the power on mode, and the second power domain 125A is in the power off mode. In this case, the GPI circuit, which serves as the weakly push circuit 14 in the first power domain 123A, may be weakly pulled down (or weakly pulled up) to generate a pull down voltage signal (or a pull-up voltage signal), and the transmission path 127A is stably maintained in a low logic state (or a high logic state) through the input/output pin of the GPI circuit. Therefore, when the electronic device 100 is in the power-saving state, unknown signals can be prevented from interfering with normal operation of the first power domain 123A as a result of entering the first power domain 123A from the second power domain 125A.

In some embodiments, a transmission path is also established between the third power domain 132, 132' of the working module 130 and the fourth power domain 134, 134' of the working module 130, 130'. In addition, when the working module 130, 130' enters the standby mode, the transmission path is maintained in a logic state to prevent unknown signal from interfering with normal operation of the third power domain 132, 132' as a result of entering the third power domain 132, 132' from the fourth power domain 134, 134'. In some embodiments, the working module 130, 130' may further include a weakly push circuit located in the third power domain 132, 132', so that the transmission path can be maintained in a logic state through the voltage state signal generated by the weakly push circuit.

Based on the above, according to the embodiments of the present invention, when a power domain in the repeater module of the electronic device is powered off, a transmission path between the power domain that is powered off and a power domain that is powered on is stably maintained in a logic state, thereby preventing unknown signals (including noise), from the power-off power domain, from entering another power domain and interfering with the logic operation of the power domain, to maintain normal operation of the electronic device. Therefore, an isolation cell is not required, and a cumbersome isolation setting process is not required either. In this way, when a new element is added, an electronic device can be woken up and caused to enter the standby mode without changing a system design of the electronic device, thus greatly reducing design costs and design duration of an electronic device.

What is claimed is:

1. An electronic device with power-off partition, wherein the electronic device comprises:
   a signal transmitting module configured to transmit a standby signal;
   two repeater modules, wherein each of the repeater modules comprises:
      a first power domain;
      a second power domain, wherein when the second power domain is in a power off mode, a transmission path between the first power domain and the second power domain is maintained in a logic state; and
      a transceiver circuit is in the first power domain, wherein the transceiver circuit of one of the two repeater modules encodes the standby signal obtained from the signal transmitting module and transmits an encoded standby signal, and the transceiver circuit of the other of the repeater modules decodes the encoded standby signal and transmits a decoded standby signal; and
   a working module which transmits, according to the decoded standby signal, a power-off signal to the transceiver circuits of the two repeater modules, so that the second power domains of the two repeater modules enter the power off mode in response to the power-off signal.

2. The electronic device with power-off partition according to claim 1, wherein the first power domain is in a power on mode.

3. The electronic device with power-off partition according to claim 1, wherein the first power domain and the second power domain are coupled to a power supply, and the power supply stops supply of power to the second power domain in response to the power-off signal, so that the second power domain enters the power off mode.

4. The electronic device with power-off partition according to claim 1, wherein the signal transmitting module transmits a wake-up signal, the transceiver circuit of one of the two repeater modules encodes the wake-up signal obtained from the signal transmitting module and transmits an encoded wake-up signal, the transceiver circuit of the other of the repeater modules decodes the encoded wake-up signal and transmits a decoded wake-up signal, and the working module transmits a power-on signal to the transceiver circuits of the two repeater modules according to the decoded wake-up signal, so that the second power domains of the two repeater modules enter a power on mode in response to the power-on signal.

5. The electronic device with power-off partition according to claim 4, wherein the working module enters a standby mode in response to the decoded standby signal and enters a working mode in response to the decoded wake-up signal.

6. The electronic device with power-off partition according to claim 4, wherein the first power domain and the second power domain are coupled to a power supply, and the power supply restores supply of power to the second power domain in response to the power-on signal, so that the second power domain enters the power on mode.

7. The electronic device with power-off partition according to claim 1, wherein the first power domain has a first connection pad, and the second power domain has a second connection pad, and the second connection pad is coupled to the first connection pad to form the transmission path.

8. The electronic device with power-off partition according to claim 1, wherein each of the repeater modules further comprises a weakly push circuit in the first power domain, and when the second power domain is in the power off mode, the transmission path is maintained in the logic state in response to a voltage state signal generated by the weakly push circuit.

9. The electronic device with power-off partition according to claim 8, wherein the weakly push circuit is a weakly pull-low circuit, the voltage state signal is a pull-down voltage signal, and the logic state is a low logic state.

10. The electronic device with power-off partition according to claim 8, wherein the weakly push circuit is a weakly pull-high circuit, the voltage state signal is a pull-up voltage signal, and the logic state is a high logic state.

11. A partition-based power-off method for an electronic device, wherein the electronic device comprises a signal transmitting module, two repeater modules, and a working module, each of the repeater modules comprises a first power domain, a second power domain, and a transceiver circuit in the first power domain, and the partition-based power-off method comprises:
   encoding, by the transceiver circuit of one of the two repeater modules, a standby signal from the signal transmitting module and transmitting an encoded standby signal;
   decoding, by the transceiver circuit of the other of the repeater modules, the encoded standby signal and transmitting a decoded standby signal; and
   transmitting, by the working module, a power-off signal to the transceiver circuits of the two repeater modules according to the decoded standby signal, so that the second power domains of the two repeater modules enter a power off mode in response to the power-off signal, wherein when the second power domain of each of the repeater modules is in the power off mode, a transmission path between the first power domain and the second power domain of each of the repeater modules is maintained in a logic state.

12. The partition-based power-off method for an electronic device according to claim 11, wherein the first power domain is in a power on mode.

13. The partition-based power-off method for an electronic device according to claim 11, wherein the first power domain and the second power domain are coupled to a power supply, and the power supply stops supply of power to the second power domain in response to the power-off signal, so that the second power domain enters the power off mode.

14. The partition-based power-off method for an electronic device according to claim 11, further comprising:
   encoding, by the transceiver circuit of one of the two repeater modules, a wake-up signal from the signal transmitting module and transmitting an encoded wake-up signal;
   decoding, by the transceiver circuit of the other of the repeater modules, the encoded wake-up signal and transmitting a decoded wake-up signal; and
   transmitting, by the working module, a power-on signal to the transceiver circuits of the two repeater modules according to the decoded wake-up signal, so that the second power domains of the two repeater modules enter a power on mode in response to the power-on signal.

15. The partition-based power-off method for an electronic device according to claim 14, further comprising:

causing the working module to enter a standby mode in response to the decoded standby signal; and causing the working module to enter a working mode in response to the decoded wake-up signal.

16. The partition-based power-off method for an electronic device according to claim 14, wherein the first power domain and the second power domain are coupled to a power supply, and the power supply restores supply of power to the second power domain in response to the power-on signal, so that the second power domain enters the power on mode.

17. The partition-based power-off method for an electronic device according to claim 11, wherein the first power domain has a first connection pad, the second power domain has a second connection pad, and the second connection pad is coupled to the first connection pad to form the transmission path.

18. The partition-based power-off method for an electronic device according to claim 11, wherein each of the repeater modules further comprises a weakly push circuit in the first power domain, and the transmission path is maintained in the logic state in response to a voltage state signal generated by the weakly push circuit when the second power domain is in the power off mode.

19. The partition-based power-off method for an electronic device according to claim 18, wherein the weakly push circuit is a weakly pull-low circuit, the voltage state signal is a pull-down voltage signal, and the logic state is a low logic state.

20. The partition-based power-off method for an electronic device according to claim 18, wherein the weakly push circuit is a weakly pull-high circuit, the voltage state signal is a pull-up voltage signal, and the logic state is a high logic state.

* * * * *